(No Model.)

J. SPRING.
POTATO DIGGER.

No. 324,424. Patented Aug. 18, 1885.

Witnesses.
A. Ruppert.
Alfred T. Gage.

Inventor:
Jacob Spring,
Per
Thomas P. Simpson
Attorneys.

UNITED STATES PATENT OFFICE.

JACOB SPRING, OF BRIDGEWATER, NEW YORK.

POTATO-DIGGER.

SPECIFICATION forming part of Letters Patent No. 324,424, dated August 18, 1885.

Application filed May 25, 1885. (No model.)

*To all whom it may concern:*

Be it known that I, JACOB SPRING, of Bridgewater, in the county of Oneida and State of New York, have invented an Improved Potato-Digger, of which the following is a specification.

The special object of the invention is to so construct a potato-digger that the potatoes will be properly separated from the vines and soil and left clearly in view of those who come after the plow in order to pick them up.

The invention will first be described in connection with the drawings, and then pointed out in the claim.

Figure 1:
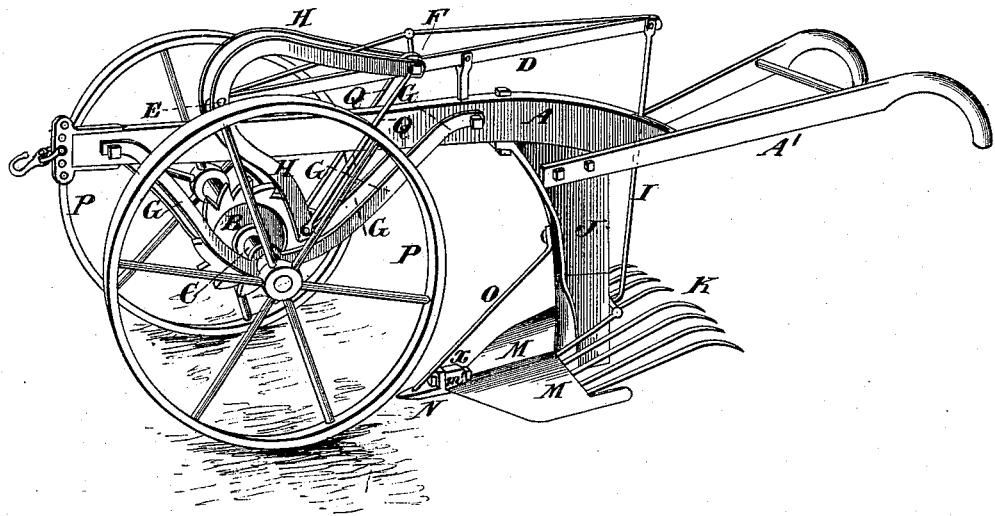
Figure 2:
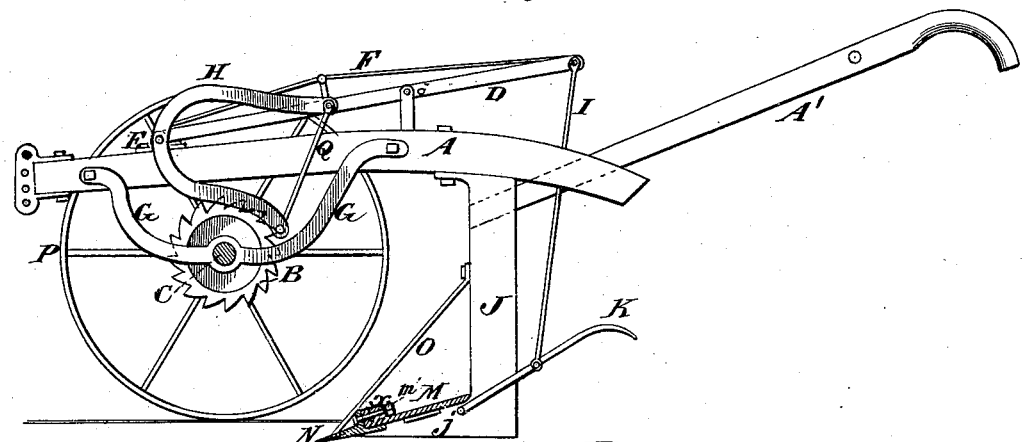
Figure 3:
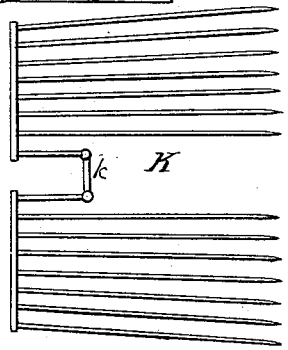

In the drawings, Figure 1 is an elevation in perspective; Fig. 2, a longitudinal section, and Fig. 3 a detail plan view of the separator.

In the drawings, A represents the beam, and A' A' the handles. B is a ratchet-wheel fast on a shaft, C, having ground-wheels P P.

M is the lifting-plow, having wings $m$, and carrying in front the median point N. This point is constructed with a perforated vertical flange, through which passes a bolt, $x$, on whose front end screws a nut, as shown in Fig. 1 of the drawings, and which bolt also passes through an eye, $m'$, on the front end of lifting-plow M. A projecting heel of the point passes under the front end of the plow. This enables the point to be conveniently held attached or removed. The point N is further secured from displacement by a brace, O, which is made fast to a standard, J, attached to the beam A. This standard has at the bottom and at right angles thereto a shoe, $j$, upon which the lifting-plow M is fastened.

K represents the separator, which is provided with a crank, $k$, connected by a pivoted rod, I, with the beam D. The latter is fulcrumed to a standard, at $d$, and as the rod I passes through a guide-groove in beam at $a$, must always move in the same vertical plane.

H is a bar consisting of two parallel plates, secured to the beam-lever at E F, and connected at its ends by rods Q Q, which pass on opposite sides of beam A, so as to serve as guides. As the ratchet-wheel turns, the teeth bear upon a cross-pin in bar H, lifting and letting it drop, thus operating the lever-beam D so that the separator K, pivoted to the shoe $j$, will play up and down. This shakes the dirt loose from the potatoes and causes it to sift through the fingers, while the clean potatoes pass over the length of the fingers and drop out behind. Before this takes place the brace O, being at a much greater angle to the earth than the plow M, pulls the vines from the earth and they pass to one side of the furrow.

G G are brackets attached to the beam at each end, and having a downward bend at the middle, where are located bearings for the axle C.

Having thus described all that is necessary to a full understanding of my invention, what I claim as new, and desire to protect by Letters Patent, is—

The combination of a lifting-plow, M, having eye $m'$ at the median front end of a double mold-board, the nutted screw $x$, and the point N, having a perforated vertical flange, through which the screw passes, and a heel that passes under the plow front, as and for the purpose described.

JACOB SPRING.

Witnesses:
 ZENAS ELDRED,
 ALEXANDER H. MORRISON.